Feb. 12, 1935.   F. A. FAHRENWALD   1,991,016
NONBUCKLING DAMPER FOR HIGH TEMPERATURE FLUES
Filed Sept. 29, 1930
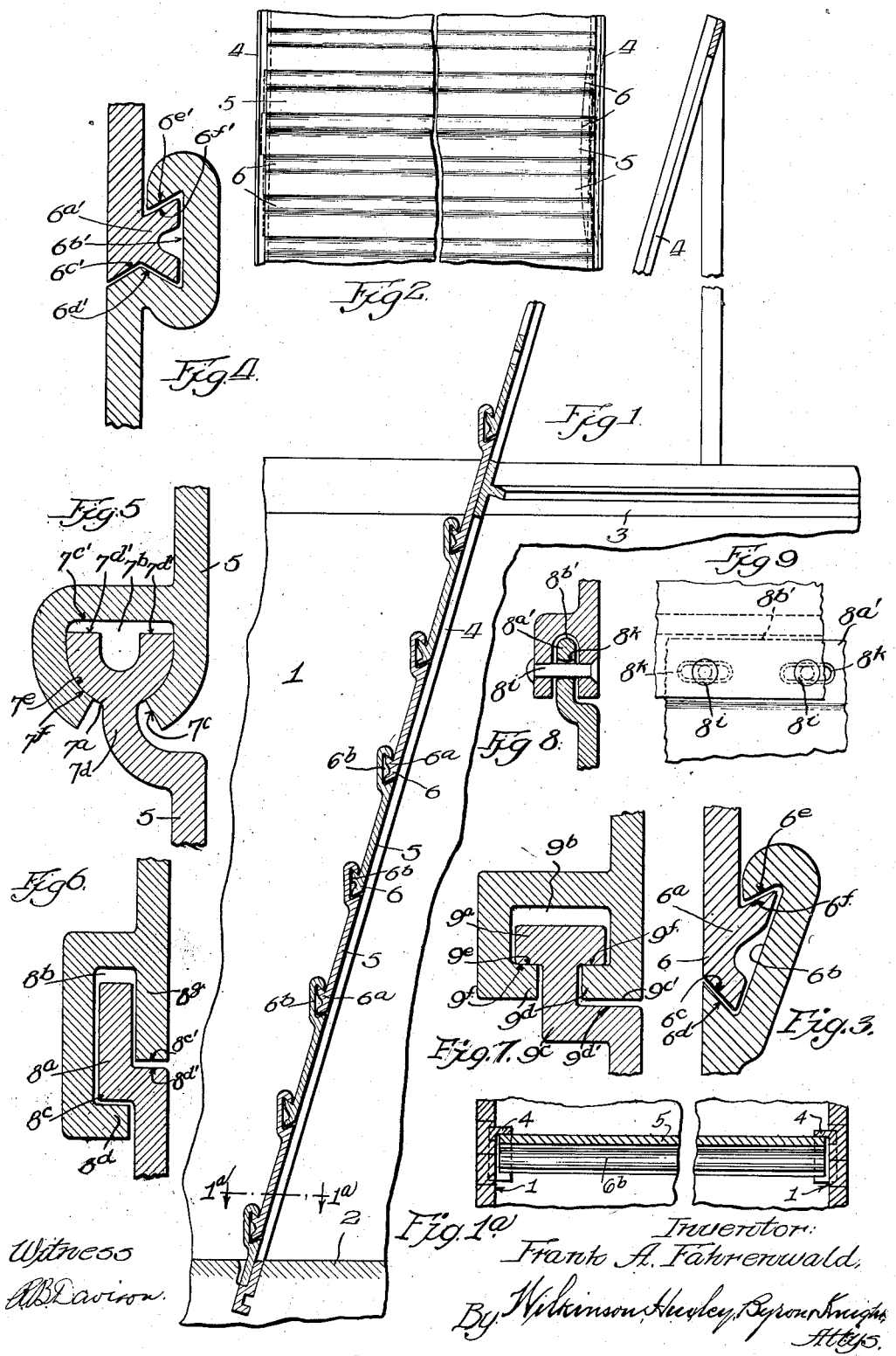

Patented Feb. 12, 1935

1,991,016

UNITED STATES PATENT OFFICE 1,991,016

NONBUCKLING DAMPER FOR HIGH TEMPERATURE FLUES

Frank A. Fahrenwald, Chicago, Ill.

Application September 29, 1930, Serial No. 485,281

7 Claims. (Cl. 126—285)

This invention relates to a damper for flues in which it is necessary to control the flow of gases of very high temperatures, and particularly to a damper of the sliding gate type.

The present invention provides a damper which, independently of artificial cooling influences, will withstand extreme heat without buckling, and one which will conform to its seat or slide track even though the latter become distorted by unequal expansion or distortion of masonry in which it is mounted; also constructs the damper seat or slide track in a manner to prevent it embracing the damper to an extent which would resist sliding movement of the damper under such conditions of distortion; and these conditions are realized in a damper which, while composed of separate panels or sections, will be assembled as a unit without the employment of an assembly frame or connecting bar, but with the individual units of the damper inter-connected or articulated in a manner to render them mutually sustaining whether the damper be supported by suspension through means of its uppermost member, or in a column with each section resting by gravity upon the one beneath it, hereinafter referred to as columnar support and in which the damper units, in addition to being flexibly intersupported, have their articulations so designed and provided with such tolerance between the interlocking parts that some relative movement perpendicular to the plane of the damper will be permitted; and even with minor irregularities in the slide track and notwithstanding the units are interlocked against separation, one unit cannot hold an adjacent unit off its seat on the slide track. Moreover, in the preferred form of the invention, intersupport among the units, whether by suspension or in column, tends to align the units in the plane of the damper.

In realizing the novel conditions just referred to, it is essential that the area of the damper be not only divided up into individual units of relatively small vertical dimension, but that these units be articulated in a manner to afford at least limited flexibility in the articulations, or flexibility sufficient to permit the damper to conform to an irregular track or seat; and the articulations must also be such that flexibility will be limited to a degree that will prevent buckling of the damper that would result in its slumping downward or falling away from its track, particularly when in a state of columnar support; and in addition to these conditions of articulation, it is desirable to have the intersupport existing between the sections, whether columnar support or support by suspension, imparted through the medium of impinging surfaces of sufficient area and appropriate angular direction to oppose relative rocking movement when under vertical load in either direction, notwithstanding limited flexibility needed for conforming the damper to its seat by tolerance in the fit of the parts perpendicular to the plane of the damper. Also, since the best results are obtained by having the damper sections of massive proportions, as distinguished from sheet metal construction, it is desirable to design the articulations with special reference to the production of the damper sections by foundry methods.

As a means for realizing the conditions above enumerated, the invention contemplates a series of panel-like damper sections, relatively narrow vertically but which may conform in length to the full lateral dimension of the damper; having these sections made in massive form with articulating means along their meeting edges involving non-rotatable tongue-and-groove elements received the one within the other with sufficient tolerance to permit slight flexibility while resisting flexibility sufficient to permit the damper to collapse, the faces of the tongue-and-groove which enter into impingement while the damper is resting in columnar support being preferably of a form that imposes substantial resistance to the tipping of one section upon the other; and in the preferred form the faces through which the units bear one against the other, either upwardly or downwardly, are inclined to both the vertical and horizontal planes, so as to deflect the unit into the plane of the damper or cause each unit to move until it finds its own seating on the track. The invention also contemplates a seat or slide track for the damper which involves but one face of the damper in a seating and sliding operation, the opposite face being free and the articulations being located wholly on the face remote from the seat; the seat being preferably provided with faces perpendicular to its seating surface through which it limits displacement of the damper laterally in either direction but without normally contacting with the damper edges; and the arrangement as a whole being such that each damper section, while adapted to transmit support to or receive it from each of the adjacent damper sections, will be free to expand and contract independently of the adjacent sections, as well as to slide laterally in the plane of the damper independently of the other sections.

In the accompanying drawing, in which one general embodiment of the damper arrangement and six different designs of articulation construction are shown—

Figure 1 is a sectional view of a portion of a furnace flue and a damper together with the slide track upon which the damper seats, intermediate portions of the overhead guiding means being broken away. Figure 1a is a section on the line 1ax—1ax of Figure 1.

Figure 2 is a face view of a portion of the damper and slide track shown in Figure 1, an intermediate portion of the damper being broken away.

Figure 3 is a detail view of the design of articulation shown in Figure 1.

Figures 4, 5, 6, 7 and 8 are sectional views showing modified designs of articulating construction; and Figure 9 is a face view showing a fragmentary portion of the construction shown in Figure 8.

1 represents the side wall, and 2 and 3 the bottom and top walls of a flue through which hot gases flow and are to be controlled. 4 represents the damper seat in the form of rails of T or L-section, or some other form that will avoid confining the damper in more than one direction perpendicular to the plane of the damper and at the same time limit lateral movement of the individual sections without possibility of binding against the edges thereof; that is to say, while provided with flanges or guide walls perpendicular to the seating surfaces, these side walls are so spaced that they cannot both contact simultaneously with the edge surfaces of the damper sections. The damper proper comprises panel-like sections 5 of massive construction, with articulations at their meeting horizontal edges on one side of the plane in which it meets the seat 4. The articulations between the damper sections comprise lugs 6a related as articulating tongues to the grooves 6b, the sections of the tongues and grooves being such that the members can be assembled only by a sidewise telescoping movement. Thus, in the form of articulation shown in Figures 1, 2 and 3, the lug 6a is of dovetail form and the groove 6b is correspondingly undercut, but the parts are arranged at a substantial angle to the plane of the damper. Figure 4 shows a somewhat similar dovetail lug 6a' entering an undercut groove 6b', which parts are substantially parallel to the plane of the damper. In Figure 5, lug 7a enters a groove 7b which has a reduced slot 7c to receive the neck 7d connecting the lug 7a with the next lower panel. In Figure 6, the tongue 8a enters the groove 8b and rests through means of its offset 8c upon the ledge 8d of the groove.

In Figure 7 the T-shaped lug 9a enters the groove 9b and rests with its lug 9a upon the ledges 9d while the neck 9c connects the head with the next lower panel.

In each of the forms of articulating construction shown, vertical support is transmitted in both directions through means of impinging surfaces which tend to force the sections or panels of the damper into alignment under the load transmitted, particularly under columnar support, and to a greater or less degree when the construction is under support by suspension. These impinging faces also perform the service of limiting gas seepage to a degree which will prevent cutting tongues of flame licking over the edges of the members of the articulation. Thus, in Figure 3 the opposing faces 6c, 6d, and in Figure 4 the opposing faces 6c' and 6d', enter into impingement under columnar support or support in which each panel rests by gravity upon the one beneath it and force the members into anti-tipping or anti-buckling relation by the forms of the faces, whereas, under support by suspension, face 6e enters similarly into stable seating against the face 6f in Figure 3, and the face 6e' similarly coacts with the face 6f' in Figure 4. In Figure 5 the faces 7c' and 7d' impinge under columnar support with an anti-tipping effect which tends to keep the panels in alignment, while arcuate faces 7e and 7f impinge under support by suspension. In Figure 6 faces 8c' and 8d' impinge under columnar support with the vertical faces at 8g exercising a strong control against tipping, while the opposed faces of the parts 8c and 8d impinge under support by suspension. In Figure 7 the faces 9c' and 9d' impinge under columnar support, while the faces 9e and 9f impinge under support by suspension.

In Figures 8 and 9 is shown a construction similar to that shown in Figure 6, but without the underlapping portion 8d and without the functioning of the opposed faces 8c' 8d' in columnar support. Instead of suspensional and columnar support by opposed shoulders on the parts, Figures 8 and 9 use rivets 8i passing through the walls of the groove 8b' and the intervening tongue 8a'; the holes 8k in the tongue 8a' being elongated horizontally to allow for differential expansion of the two articulated members.

With any of the several constructions shown, the damper panels are all free to expand and contract independently one of the others under changes in temperature; the tendency to buckling is resisted by the shapes of the impinging faces; the articulation constructions are all on the face of the damper opposite to that through which it impinges against its seat; there is sufficient tolerance in the construction of the articulations to permit relative angular movement within limits demanded by any expected distortion of the seat 4; and the damper will remain at all times in condition for manipulation while maintaining its seat under gravity.

I claim:

1. In a damper for high temperature flues, damper panels, and means articulating meeting marginal portions of said panels against separation in both vertical directions, said means, comprising a dovetail lug on one panel and an undercut groove on the other panel; and the faces which define said lug and groove and through which they impinge during inter-support between the units being flat.

2. In a damper for high temperature flues, damper panels, and means articulating meeting marginal portions of said panels, comprising a dovetail lug on one panel and an undercut groove on the other panel; the faces through which said lug and groove impinge one against the other being at a substantial angle to the plane of the damper and to the direction of the load when the units are inter-supported.

3. In a damper, panels constituting units of said damper and constructed at their meeting marginal portions with telescopic articulating joint members affording intersupport between said panels in both vertical directions in the plane of the damper; said articulating members comprising tongues or lugs entering undercut grooves and having opposed faces through which they seat one against the other in both vertical directions; at least those faces through which the articulating members seat one upon another when the damper is supported from the bottom, being flat faces which, while permitting limited hinging movement between the panels, normally resist such movement.

4. In a damper, panels constituting units of said damper, constructed at their meeting marginal portions with telescopically connected articulating joint means comprising tongues or lugs on one unit entering grooves on the other unit; said articulating means seating one against the other in both vertical directions in the plane of the damper and thereby establishing inter-support between the panels, both when the damper is under suspension and when it is in columnar support from the bottom; the surfaces through which the members of the articulating means seat one against the other when the damper is supported in suspension, being flat and permitting limited hinging movement between the panels but normally resisting such hinging movement.

5. In a damper, panels constituting units of said damper constructed at their meeting marginal portions with telescopically connected articulating joint means comprising tongues or lugs on one unit entering grooves on the other unit; said articulating means seating one against the other in both vertical directions in the plane of the damper and thereby establishing inter-support between the panels both when the damper is under suspension and when it is in columnar support from the bottom; the surfaces through which the members of the articulating means seat one against the other when the damper is supported in suspension, and also those surfaces through which said articulating means seat when the damper is in columnar support from below, being flat and permitting limited hinging movement between the panels but normally resisting such hinging movement.

6. A damper for high temperature flues adapted to be suspended from the top or supported from the bottom comprising: a plurality of transverse panels, said panels being formed at their marginal meeting edges to provide articulated joints between said panels, said joints including cooperating faces formed to support each panel upon the panel therebeneath when said damper is supported from the bottom and to resist buckling between said panels, and said joints having additional cooperating faces formed to support each panel from a panel thereabove when said damper is suspended from the top.

7. A valve structure for the flues of a furnace comprising guides disposed in the side walls of the flues and a gate slidable within the guides, said gate comprising a plurality of sections, certain of said sections each having a T-shaped flange formed along one edge thereof and the adjacent edge of an adjoining section being provided with a correspondingly shaped groove for flexibly uniting the sections.

FRANK A. FAHRENWALD.